(No Model.) 4 Sheets—Sheet 3.

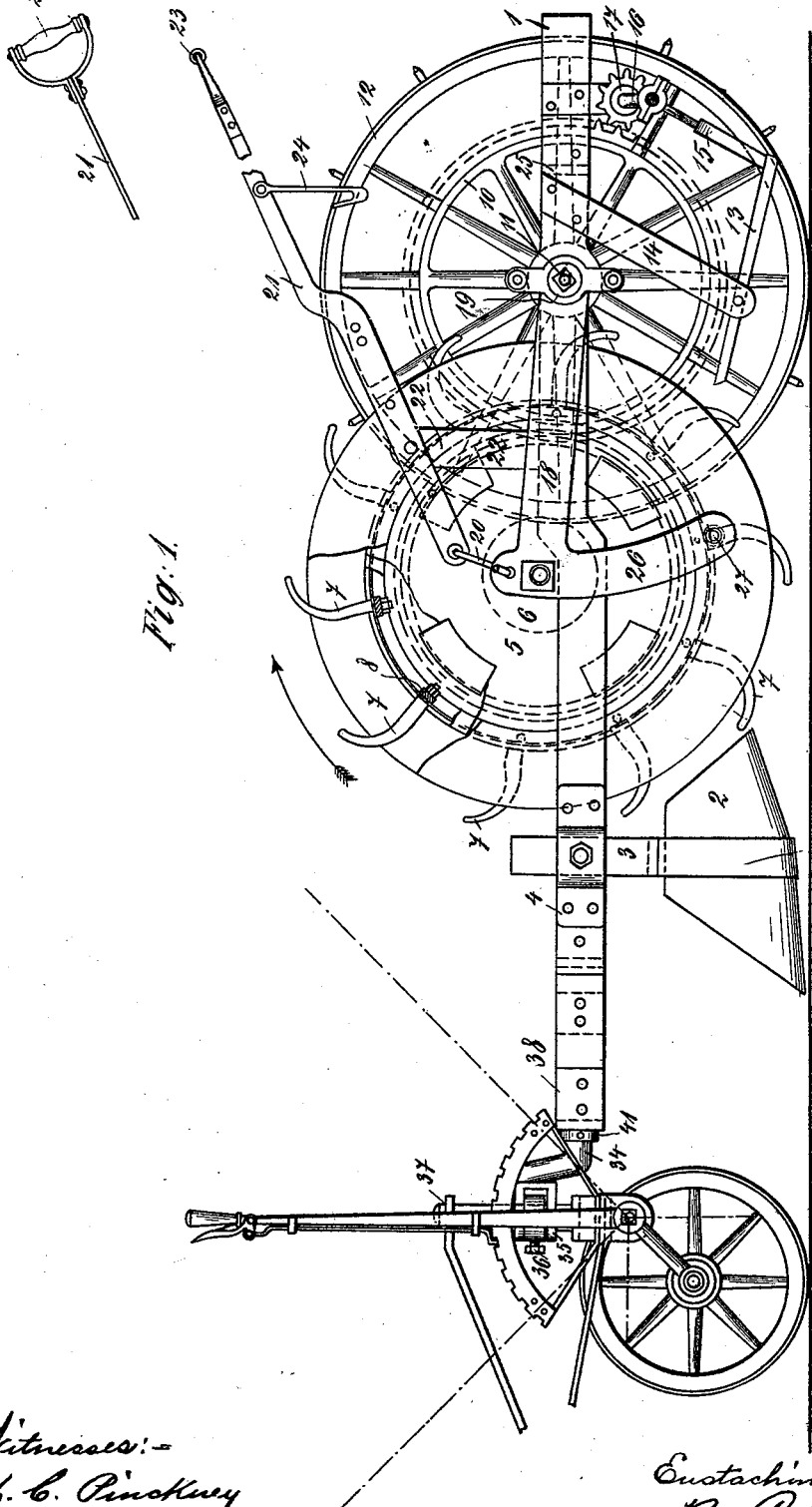

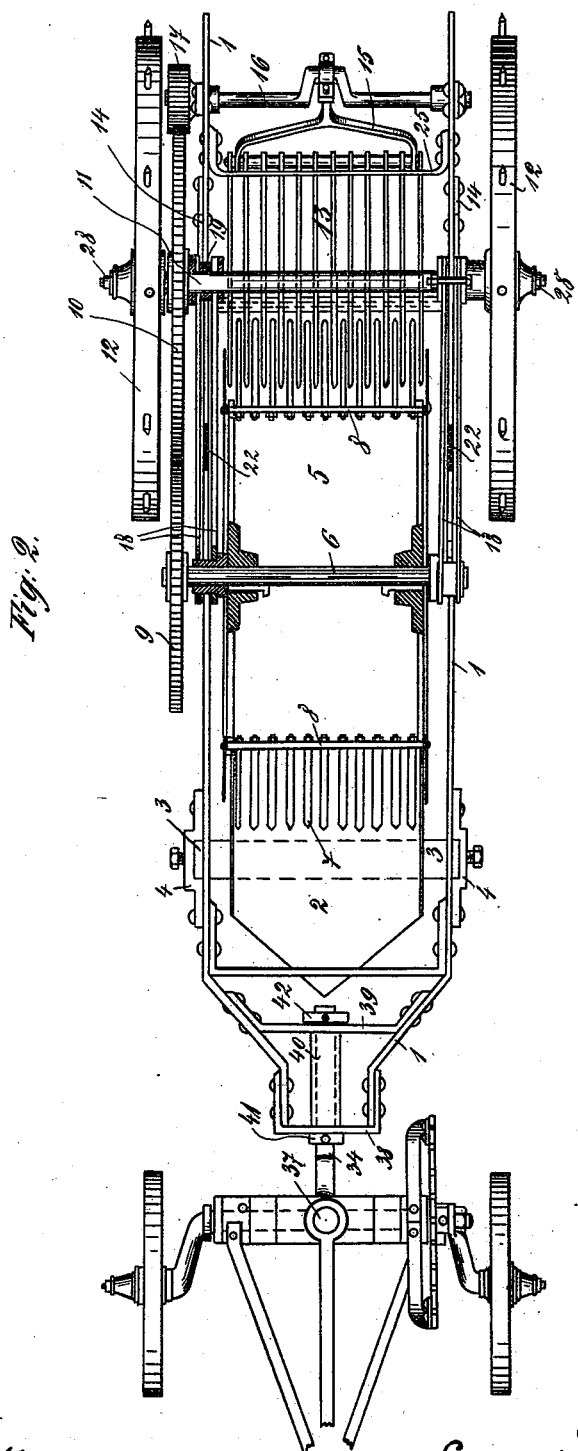

E. PAULUS.
POTATO DIGGING MACHINE.

No. 505,954. Patented Oct. 3, 1893.

Witnesses:
M. C. Pinckney
M. A. Cunningham

Inventor
Eustachius Paulus
by Bowen & Behrens,
attys.

(No Model.) 4 Sheets—Sheet 4.
E. PAULUS.
POTATO DIGGING MACHINE.
No. 505,954. Patented Oct. 3, 1893.
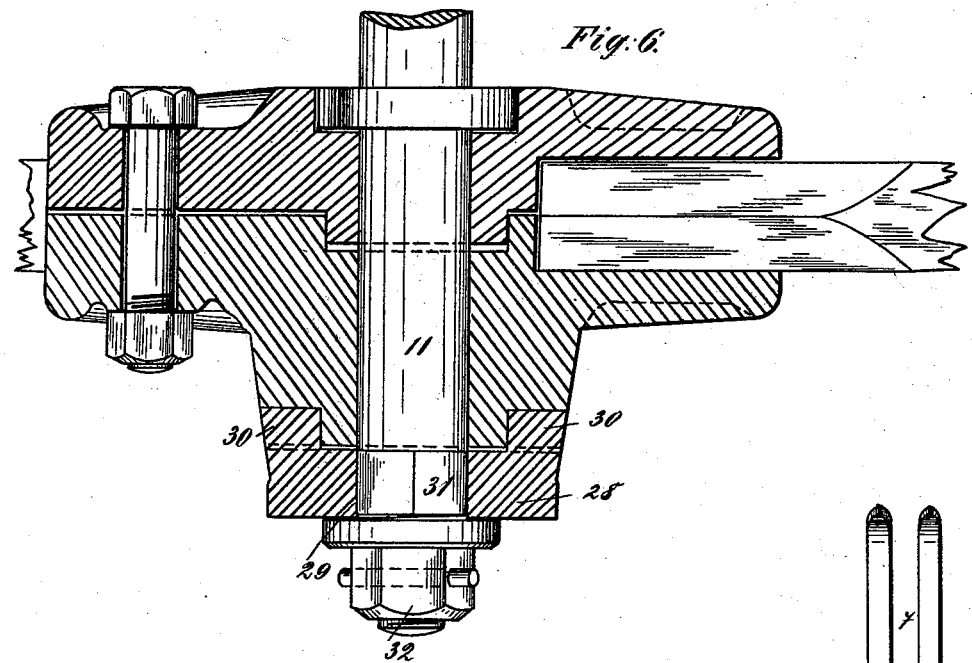
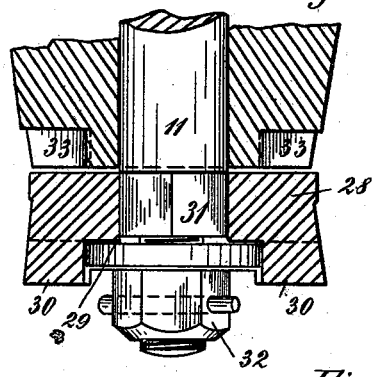
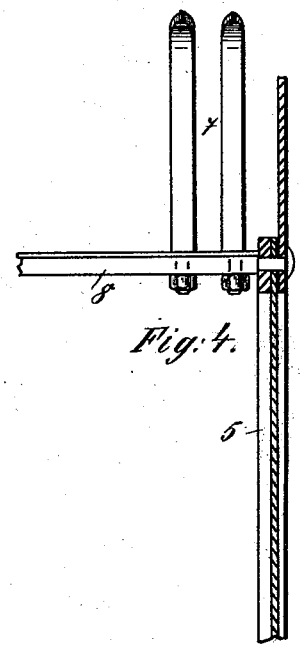
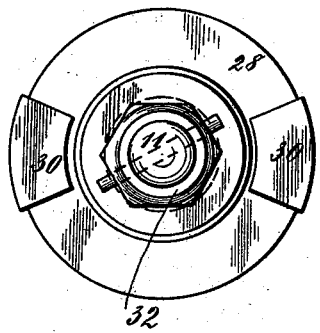
Witnesses:
M. C. Pinckney
M. A. Cunningham
Inventor
Eustachius Paulus
by Bowen & Behrens
attys.

UNITED STATES PATENT OFFICE.

EUSTACHINSZ PAULUS, OF GRAETZ, GERMANY.

POTATO-DIGGING MACHINE.

SPECIFICATION forming part of Letters Patent No. 505,954, dated October 3, 1893.

Application filed March 6, 1893. Serial No. 464,772. (No model.)

*To all whom it may concern:*

Be it known that I, EUSTACHINSZ PAULUS, a subject of the King of Prussia, residing at Graetz, a city of the Kingdom of Prussia, Germany, have invented certain new and useful Improvements in Potato-Digging Machines, of which the following is a specification.

The object of this invention is improvements in the construction of potato digging machines, in which the potatoes are raised, or dug up by a trough shaped plow share or colter, and are seized at the rear end of the latter by a series of rakes or catchers arranged on the periphery of a closed drum placed transversely to the direction of motion, the rotary motion imparted thereto by the drum causing them to first raise the potatoes thus seized, and subsequently to allow them to drop behind.

In the accompanying drawings, Figure 1 is a side view, and Fig. 2 is a plan partly in section, while the remaining figures 3 to 9, show details of construction.

Figure 5:
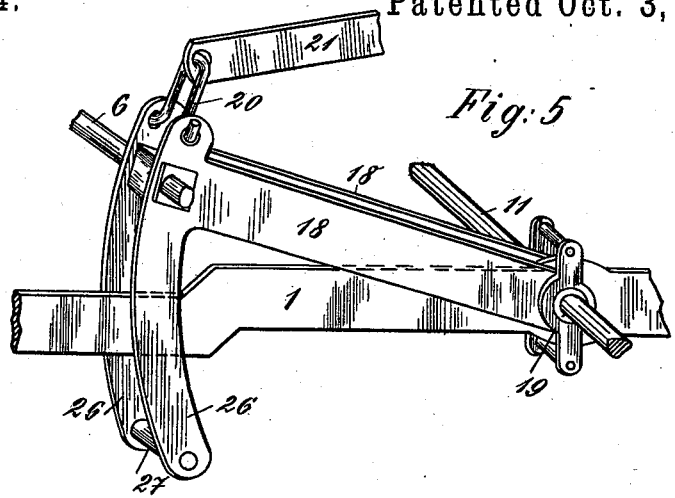
Figure 9:
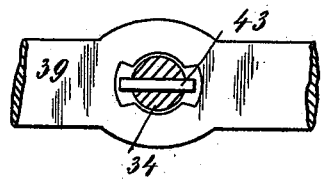
Figure 3:
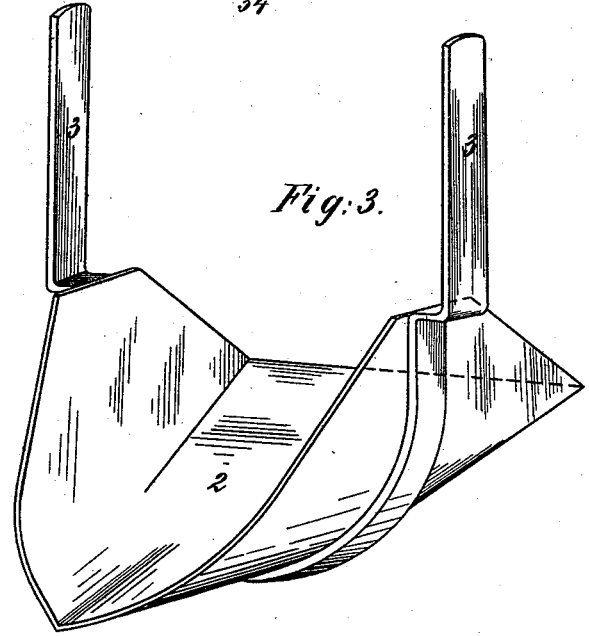

Near the front end of the main frame 1, consisting of flat iron bars joined together by angle irons (Figs. 1 and 2) is arranged the trough shaped plow share 2. This share which is shown separately in Fig. 3, is firmly fixed to a curved support 3, the ends of which pass through the straps or guides 4 (Fig. 2) secured outside the machine on the longitudinal sides of the main frame, within which these ends can be adjusted, so as to regulate the height of the support. Immediately behind the share is mounted, between the longitudinal sides of the chief frame, a drum, the axis 6 of which extends transversely across the machine. From the periphery, or outer casing of this drum, project a number of rakes (preferably twelve) arranged at equal intervals one from the other, and consisting each of a row of curved prongs 7 fitted side by side and parallel. The inner ends of the prongs of these rakes which are screw threaded pass through the casing of the drum, and through a bar 8 arranged along the inner side of the said drum, extending parallel to the axis of the latter, and the extremities of which are firmly riveted in the walls of the drum. The drum thus provided with the rakes 7 receives a rotary motion from two toothed wheels 9 and 10 gearing together, and the smaller of which, the wheel 9, is mounted on the axis of the drum, while the larger wheel 10 is keyed in the axle 11 of the rear wheel 12. The drum, which under the action of this gear is made to rotate in the direction of the arrow, Fig. 1, is so arranged relatively to the share that when the same turns, the rakes 7 pass by successively in an upward direction, their outer ends coming in close proximity to the rear edge of the share 2, so as to raise and carry with them the potatoes as they come out behind the share. The potatoes thus taken up roll while being raised by the rakes toward the drum casing and are freed from a portion of the soil which falls through the intervals between the prongs of the rakes. As soon as each rake has attained its highest position, and commences to move beyond the same, the potatoes roll behind upon the preceding rake, whereby a further portion of the soil falls through the intervals between these prongs, the potatoes and the stems and leaves remaining still on this rake. As the drum continues to rotate, the potatoes and the stems and leaves fall down backward from the rake upon the oscillating or vibrating grating 13. This grating is pivoted upon lateral arms 14 of the frame 1, and receives a shaking or rocking motion with the aid of a rod 15 connected to its rear end from the crank shaft 16 carried by the frame 1, and which is set in motion by the small toothed wheel 17 gearing with the wheel 10 of the rear wheel axle 11. The potatoes are completely freed from their soil on this grating, and are subsequently propelled backward so as to finally drop from the grating upon the ground. The arms 14 of the grating and the connecting rod 15 should be preferably made of two parts in such a manner that the arms and the rod may be lengthened or shortened, so that the grating may be adjusted up or down according to requirements.

To prevent the potatoes, raised by the share, dropping off at the sides of the machine whether just issuing from the share or being moved on by the rakes the walls of the drum 5 project beyond the casing of the same nearly as far as the outer points of the rakes and the sides of the trough shaped share 2 abut at the rear almost against the walls of the rake drum.

The following mechanism is used to maintain during the transport or operation of the above described machine, the rake drum 5 at a suitable height to avoid the rakes touching the ground. Each end of the axis 6 of the drum bears in the free ends of two levers 18 connected together, Figs. 1 and 5, and the other ends of which are pivoted upon one of the two bearings of the rear wheel axle. The free end of each pair of levers 18, Figs. 1 and 5, engages,—above the bearings of the axis of the drum, and with the aid of a wire loop or chain link 20,—one arm of the forked lever 21, the arms of which are pivoted to the upright 22 of the frame 1, while the rearmost end of the same lever terminates with a handle 23. By depressing the handle 23 of the forked lever 21, the two pairs of levers 18 will be finally turned upward upon the axle 11 of the rear wheel, and the drum 5 will be raised. While this drum is being raised, its wheel 9 engages a corresponding distance with the wheel 10 on the axle 11 of the rear wheel owing to the drum being pivoted upon the said rear wheel axle. The reverse operation takes place when the drum is lowered. To hold the drum in its raised position, the forked lever 21 is provided with a hook 24 which is fastened to the cross stay 25 (Figs. 1 and 2) of the frame 1. To prevent the raised drum from swinging to and fro during the transport, the free ends of the pairs of levers 18 are provided with lower extensions 26 having the form of circular segments, Figs. 1 and 5, which embrace between them the corresponding longitudinal sides of the frame 1, and are stiffened by a bolt below. The extensions may be provided with perforations to allow of the drum being adjusted in any suitable position by means of a pin secured at the top to the frame 1 and inserted through one of these holes. To prevent the drum rotating during the transport, the rear wheels 12 are uncoupled from their axes 11 so as to be able to turn freely thereon. For this purpose, the disks 28, Figs. 6, 7, and 8, which secure each rear wheel upon the axle, are provided with a quadrangular hole 29 in the center, and two projecting arms or clasps 30 on one front side. These disks, which are placed upon a quadrangular part or piece 31 of the rear wheel axle 11, and are held in position by a nut 32 fixed to the end of this axis assume the position shown in Fig. 6 while the machine is at work, in which position, the two clasps 30 of the disks 28 grasp the wheel hub in corresponding notches 33, Fig. 7, and thus couple the wheel 12 with its axle 11. When the machine has to be transported, these disks are first removed, and then replaced in a reverse position upon the axle 11, (see Fig. 7.) While the disks are in the above position, the clasps no more engage with the wheel hub, and hence the rear wheels do not impart a rotation to the axle.

The machine above described is connected in front with a fore carriage, the wheels of which can be adjustably raised or lowered by means of adjustable straps or hoops in the same manner as for ordinary plows. The plow beam or pole tree 34, which connects the fore carriage with the frame 1 and the forked end 35 of which is firmly held at the desired height upon the central vertical pin 37 by a set ring 36 inserted between the two prongs of this end, passes behind through holes formed in the two cross stays 38 and 39 of the frame 1, and through a strengthening sleeve 40 arranged between these two cross stays. In front of the cross stay 38, and behind the cross stay 39, two rings 41 and 42 respectively are mounted on the pole tree, so that the fore carriage may not only move relatively to the other parts of the machine upon the vertical pin 37 but also on the horizontal rear end of the beam 34, and may thus be adjusted according to the irregularities or unevenness of the ground. To prevent too great a turn of the fore carriage upon the rear end of the pole tree, the hole in the second cross stay 39, through which the plow beam passes, is enlarged on two opposite sides, Fig. 9, a pin 43 being passed in this place through the tree, the projecting ends of which extend into the enlarged parts of the said hole, and bear against the ends of this part when the pole tree is turned a given distance.

It may be finally remarked that the rake drum has such a diameter as to render unnecessary any bending of the frame and tree.

Having thus fully described my invention, I claim and desire to secure by Letters Patent of the United States—

1. In a potato digging machine, the combination of the rake drum 5, frame 1, rear wheel 12, levers 18, carrying the axis of drum 5 and lower extensions 26, 26 on such lever, substantially as and for the purposes set forth.

2. In a potato digging machine the combination of the fore carriage and the frame carrying the share, the rake drum and the rocking grate, with the beam 34 carrying pin 43, adjusted to oscillate in a lateral enlargement in the cross-stay through which it passes, whereby beam 34 is allowed to turn upon its longitudinal axis a given extent as and for the purpose described.

3. In a potato digging machine, the combination of the rear wheels 12 having recesses 33, and their axle 11 provided with a square part 31, with a detachable and reversible clutch disk 28, 30 mounted on said square part and having its clutches 30, 30 engaging with said recesses when the machine is in operative condition, substantially as and for the purposes set forth.

In testimony whereof I have signed my name to this specification in the presence of two subscribing witnesses.

EUSTACHINSZ PAULUS.

Witnesses:
AUGUST MÜHLE,
WLADIMIR ZIOTECKI.